United States Patent
Zhang

(10) Patent No.: US 8,223,485 B2
(45) Date of Patent: Jul. 17, 2012

(54) SLIDE MECHANISM FOR SLIDE-TYPE PORTABLE ELECTRONIC DEVICE

(75) Inventor: Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 248 days.

(21) Appl. No.: 12/771,291

(22) Filed: Apr. 30, 2010

(65) Prior Publication Data

US 2011/0149488 A1 Jun. 23, 2011

(30) Foreign Application Priority Data

Dec. 23, 2009 (CN) .......................... 2009 1 0312085

(51) Int. Cl.
*G06F 1/16* (2006.01)
*H04M 1/00* (2006.01)

(52) U.S. Cl. ........... 361/679.56; 361/679.55; 455/575.1; 455/575.4

(58) Field of Classification Search ............ 361/679.55–679.59, 679.01–679.45; 455/575.1, 575.4, 455/575.3; 345/156, 157, 168, 169, 905

See application file for complete search history.

(56) References Cited

U.S. PATENT DOCUMENTS

| 7,162,283 | B2 * | 1/2007 | Bae et al. | 455/575.4 |
| 7,627,355 | B2 * | 12/2009 | Amano et al. | 455/575.4 |
| 7,697,280 | B2 * | 4/2010 | Wang | 361/679.55 |
| 7,755,892 | B2 * | 7/2010 | Wang et al. | 361/679.55 |
| 7,983,725 | B2 * | 7/2011 | Zhang et al. | 455/575.4 |
| 2008/0167098 | A1 * | 7/2008 | Mizuta et al. | 455/575.4 |
| 2009/0305754 | A1 * | 12/2009 | Yuan | 455/575.4 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A slide mechanism includes a main plate, a slide plate, a locking module, a releasing module and a button. The slide plate is installed on the main plate and slidable relative to the main plate. The locking module locks with the main plate and the slide plate. The releasing module is attached to the slide plate to unlock the locking module. The button operates the releasing module to force the locking module to unlock the slide plate.

13 Claims, 8 Drawing Sheets

SLIDE MECHANISM FOR SLIDE-TYPE PORTABLE ELECTRONIC DEVICE

CROSS-REFERENCE TO RELATED APPLICATION

This application is related to co-pending U.S. patent application, entitled "SLIDE MECHANISM FOR SLIDE-TYPE PORTABLE ELECTRONIC DEVICE", by Yu Zhang, which has the same assignee as the present application. The above-identified application is incorporated herein by reference.

BACKGROUND

1. Technical Field

The present disclosure generally relates to slide mechanisms and, particularly, to a portable electronic device with two or more housings using a sliding mechanism that allows one housing to slide relative to another housing in a longitudinal direction.

2. Description of Related Art

Slide-type portable electronic devices have been increasingly used among diverse designs for portable electronic devices. The slide-type portable electronic device have two housings, of which one typically slides over the other to open/close the portable electronic device.

A slide mechanism is generally used in the slide-type portable electronic device for driving the sliding between the two housings. However, the slide mechanism needs firstly to be slid to a predetermined position by hand, then the mechanism takes over to automatically open the portable electronic device. It can be inconvenient to operate the portable electronic device in this manner.

Therefore, there is room for improvement within the art.

BRIEF DESCRIPTION OF THE DRAWINGS

Many aspects of the slide mechanism for slide-type portable electronic device can be better understood with reference to the following drawings. The components in the drawings are not necessarily drawn to scale, the emphasis instead being placed upon clearly illustrating the principles of the slide mechanism for slide-type portable electronic device. Moreover, in the drawings, like reference numerals designate corresponding parts throughout the several views.

DETAILED DESCRIPTION

Figure 1:
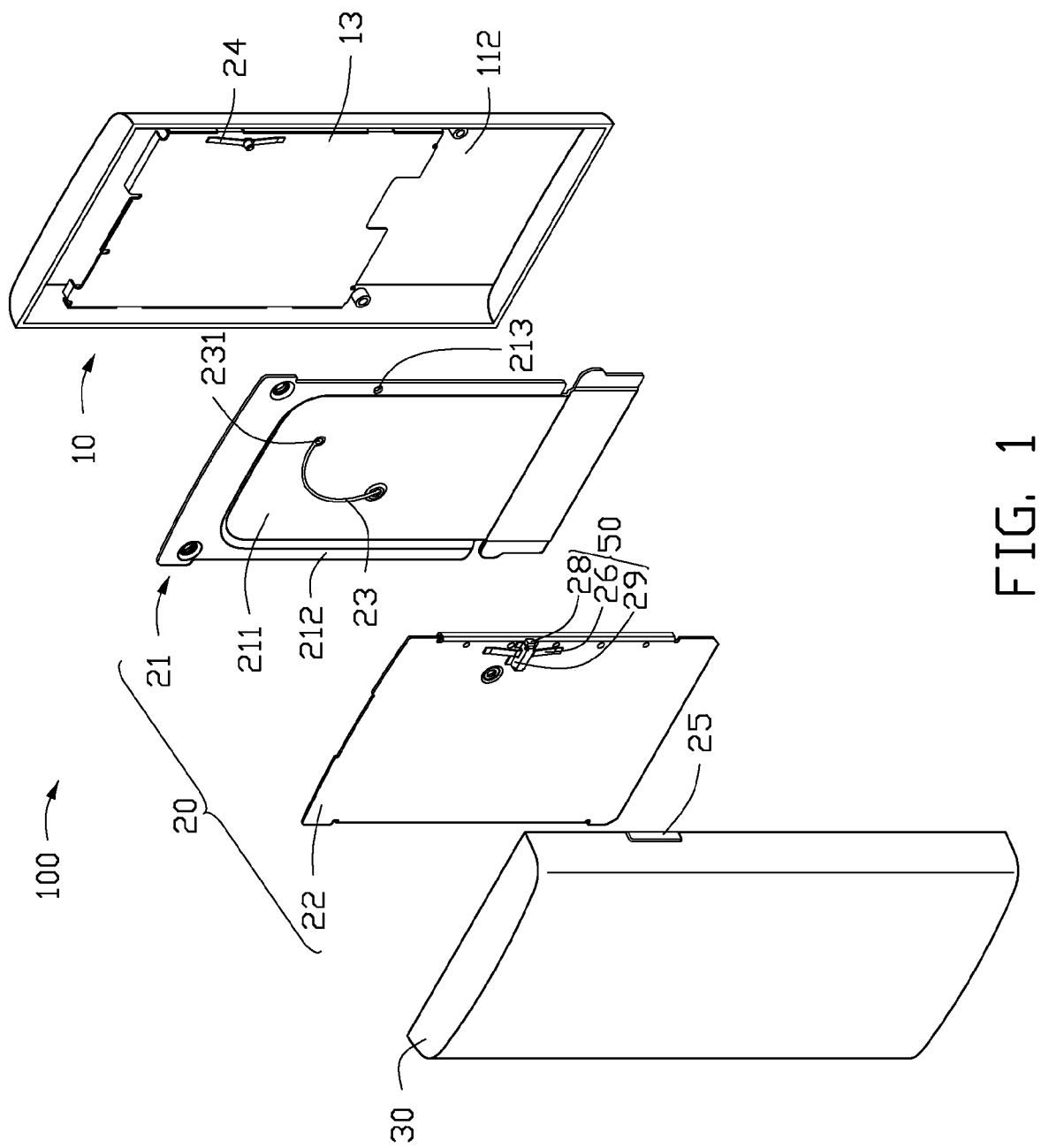
FIG. 1 is an exploded and isometric view of a portable electronic device using a slide mechanism according to an exemplary embodiment.
Figure 2:
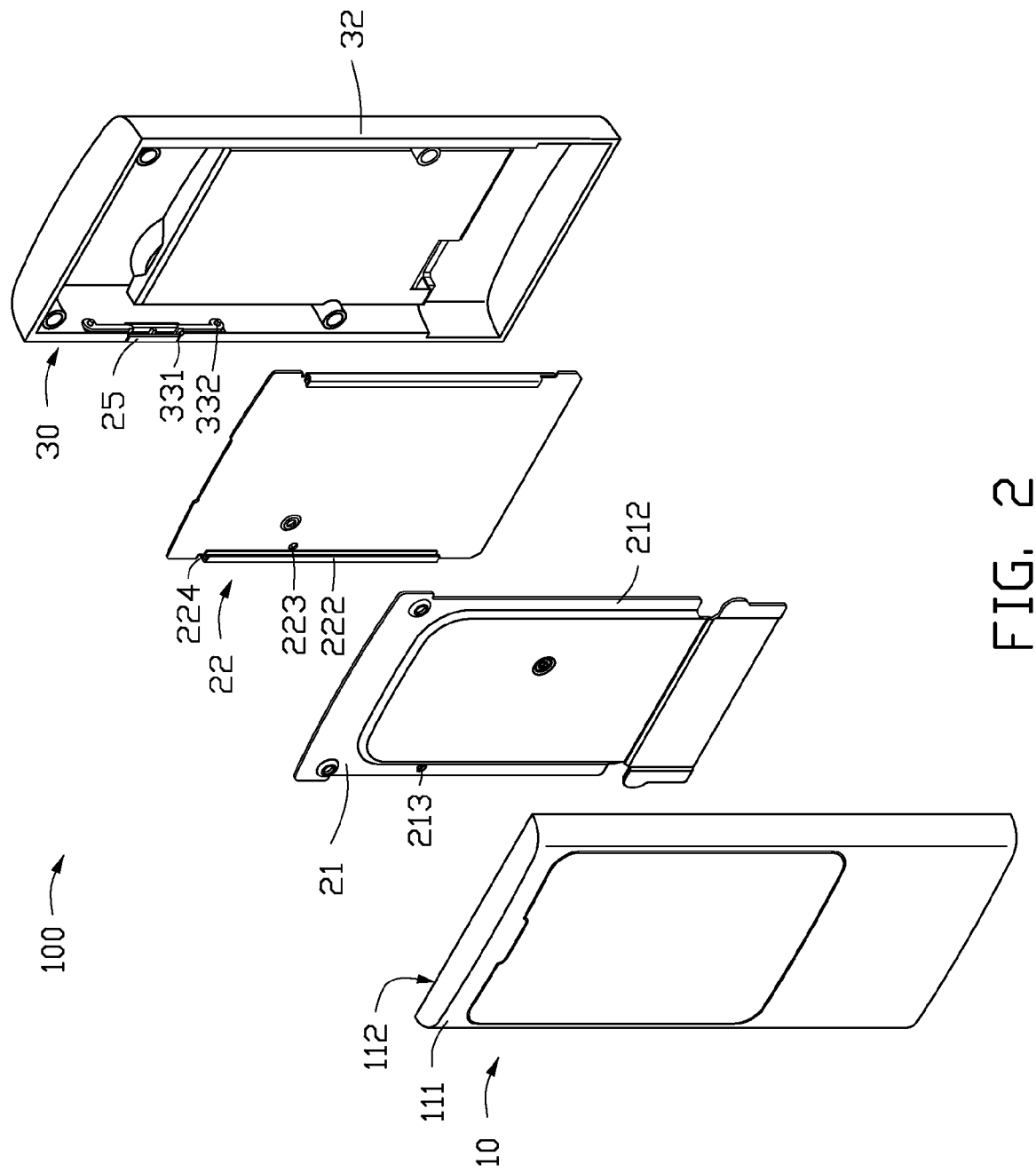
FIG. 2 is similar to FIG. 1 but showing another aspect of the slide mechanism.

FIGS. 1 and 2 show an exemplary slide mechanism 20 used in a slide-type portable electronic device 100 such as a mobile phone, a personal digital assistant, etc. The portable electronic device 100 includes a first housing 10 and a second housing 30 engaging with the first housing 10. The slide mechanism 20 provides an elastic force sufficient to slide the first and second housings 10 and 30 relative to each other. The slide mechanism 20 includes a main plate 21, a slide plate 22, an elastic member 23, a locking module 24, a button 25, and a releasing module 50. The slide plate 22 and the main plate 21 are fixed to the second housing 30 and the first housing 10, respectively. The locking module 24, the button 25, and the releasing module 50 are configured for releasably locking the slide plate 22 to the main plate 21.

The first housing 10 may be a cover of the portable electronic device, and includes a first surface 111 and a second surface 112. The first surface 111 may have a function key and a display. A mounted plate 13 is fixed to the second surface 112 of the first housing 10.

The main plate 21 includes a recessed portion 211 and two generally L-shaped rail portions 212 extending from two opposite edge ends of the main plate 21. One of the rail portions 212 defines a first through hole 213. The main plate 21 is configured for being fixed to the mounted plate 13 of the first housing 10.

The slide plate 22 is shorter than the main plate 21. The slide plate 22 includes two slide portions 222 at two opposite borders thereof. The two slide portions 222 are generally U-shaped bars defining a slide groove 224 corresponding to the two rail portions 212. The rail portions 212 can slide along the slide groove 224. The slide plate 22 defines a second through hole 223 corresponding to the first through hole 213.

The elastic member 23 includes connecting portions 231 at it's ends. The connecting portions 231 are configured to be respectively secured to the main plate 21 and the slide plate 22. The elastic member 23 are designed to have a predetermined torsion force to drive the main plate 21 to slide relative to the slide plate 22 in a closed state.

Figure 3:
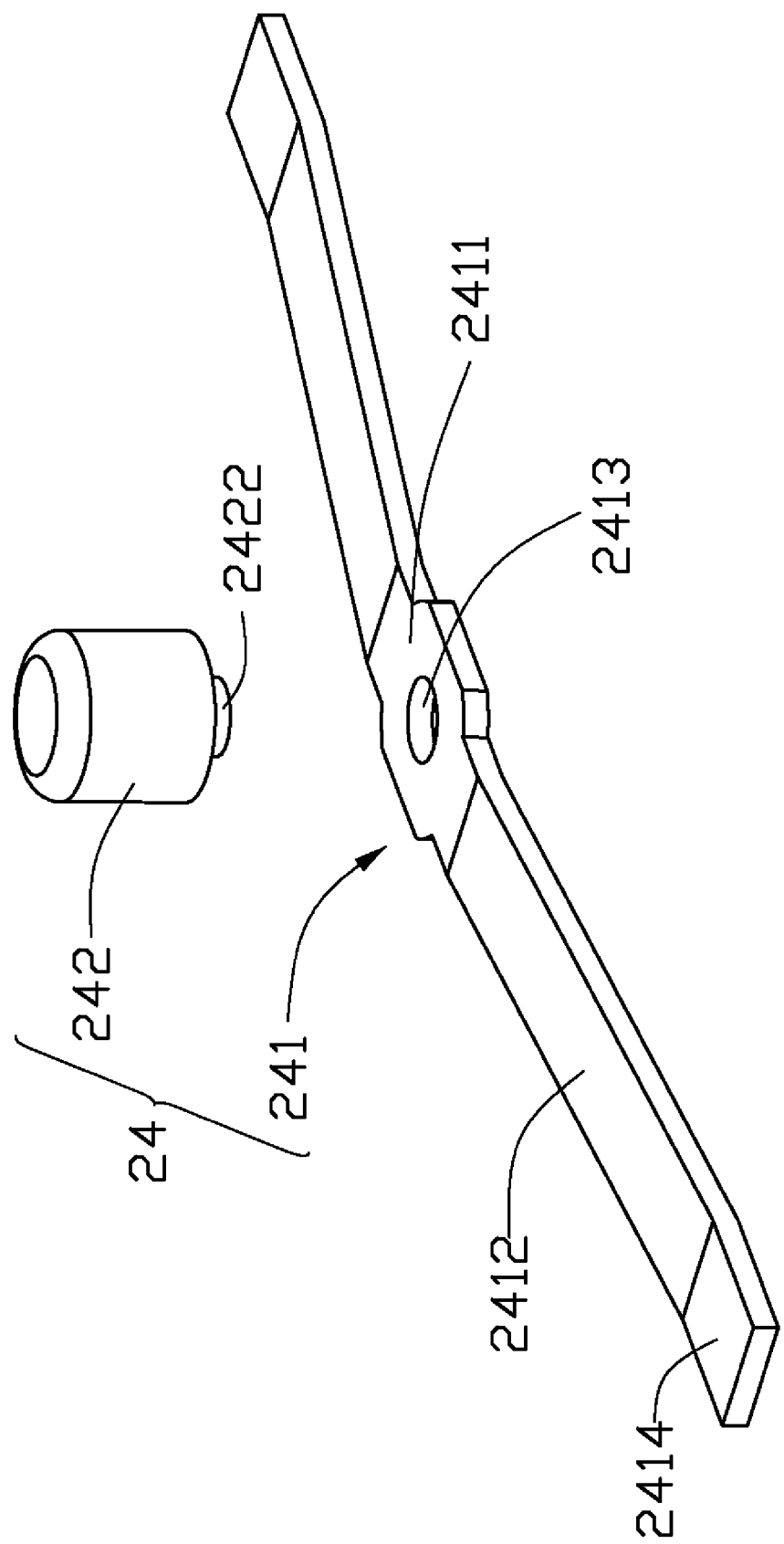
FIG. 3 is an enlarged view of a locking module in FIG. 1.

Referring to FIG. 3, the locking module 24 is configured for locking the slide plate 22 to the main plate 21 in a closed state. The locking module 24 includes a first elastic sheet 241 and a first column 242. The first elastic sheet 241 is configured for being fixed to the mounted plate 13, and includes a body 2411, and two arms 2412. Each arm 2412 respectively extends from each of two sides of the body 2411, and together constitutes an arched shape. Each arm 2412 has a distal end 2414 configured for being fixed to the mounted plate 13. The body 2411 defines a bore 2413. The first column 242 has a thinner end 2422. The thinner end 2422 is configured to be tightly engaged in the bore 2413. When the main plate 21 is assembled to the mounted plate 13, one end of the first elastic sheet 241 opposite to the thinner end 2422 is received in the first hole 213 of the main plate 21.

Figure 4:
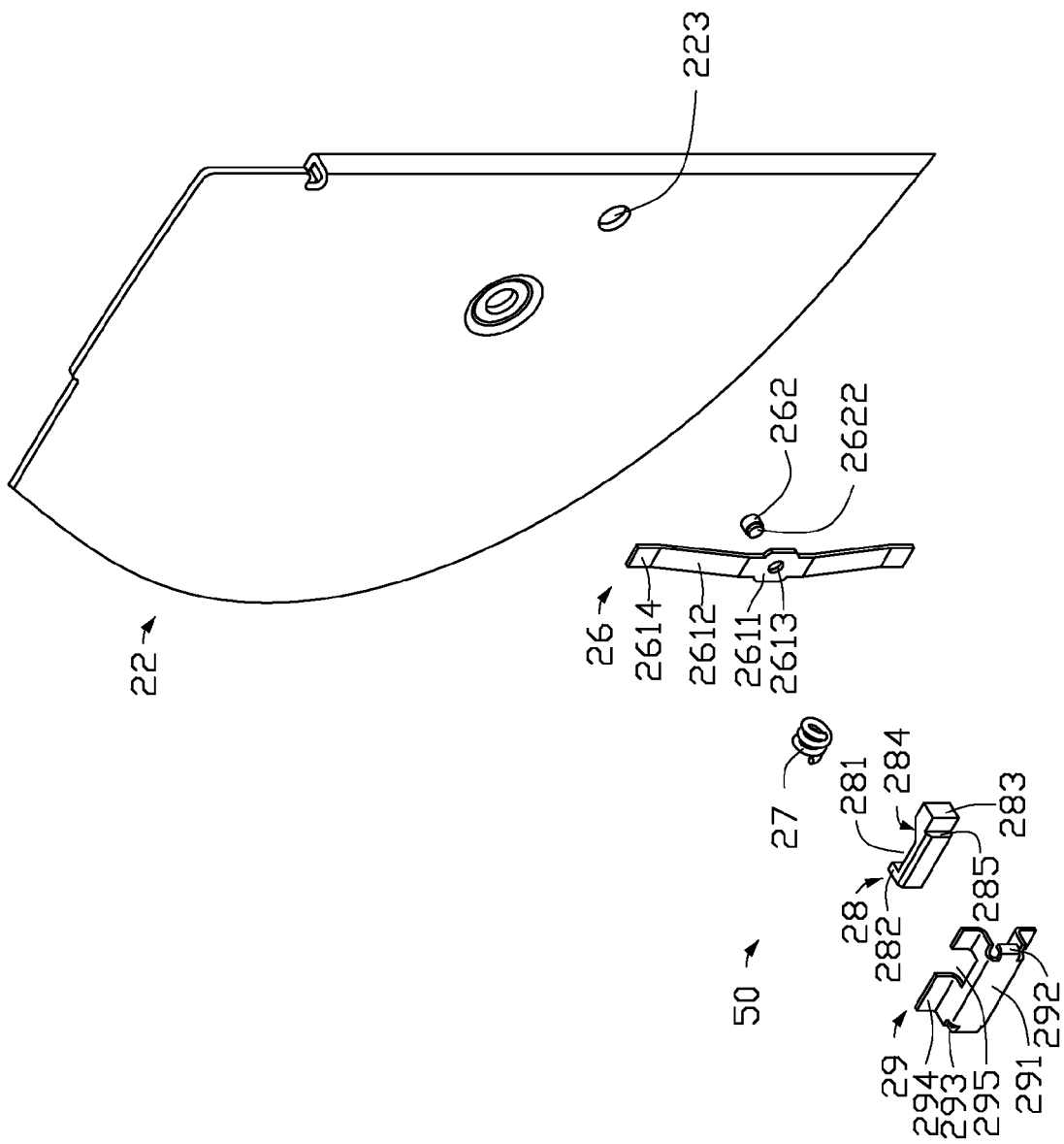
FIG. 4 is an enlarged, exploded view of the releasing module in FIG. 1.

Referring to FIG. 4, the releasing module 50 includes a second elastic sheet 26, a second column 262, a cylindrical spring 27, a contact block 28, and a fixing member 29. The second elastic sheet 26 is similar to the first elastic sheet 241, and both may be made of metal. The second elastic sheet 26 is configured for being fixed to the slide plate 22, and includes a body 2611 and two arms 2612. One arm 2612 extends from each of two sides of the body 2611, and together constitute an arched shape. Each arm 2612 has a distal end 2614 configured for being fixed to the slide plate 22. The body 2611 defines a bore 2613. The second column 262 is shorter than the first column 242. The second column 262 has a thinner end 2622. The thinner end 2622 is configured to be tightly engaged in the bore 2613. When the second elastic sheet 26 is assembled to the slide plate 22, one end opposite to the thinner end 2622 is received in the second hole 223 of the slide plate 22.

The contact block 28 includes a first resisting end 282 and an opposite second resisting end 283. A stepped portion 285 is formed on the second resisting end 283. The contact block 28 defines a cavity 281 at one side thereof, and includes a wedge surface 284. The cavity 281 is configured to receive the body 2611 of the second elastic sheet 26.

The fixing member 29 is configured to receive the contact block 28 and the cylindrical spring 27. The fixing member 29 includes a base wall 291, a first latching wall 292, a second latching wall 293, and two opposite fixing walls 294. A cutout 295 is defined at each fixing wall 294. The fixing walls 294 are configured for mounting the fixing member 29 to the slide plate 22. A space is defined by the base wall 291, the first, second latching wall 292, 293, and the fixing walls 294. The cylindrical spring 27 and the contact block 28 are received in the space. One end of the cylindrical spring 27 resists the second latching wall 293, the other end resists the first resisting end 282 of the contact block 28. The stepped end 285 of the contact block 28 is latched in the second latching wall 292. The second resisting end 283 is exposed from the fixing member 29.

Figure 5:
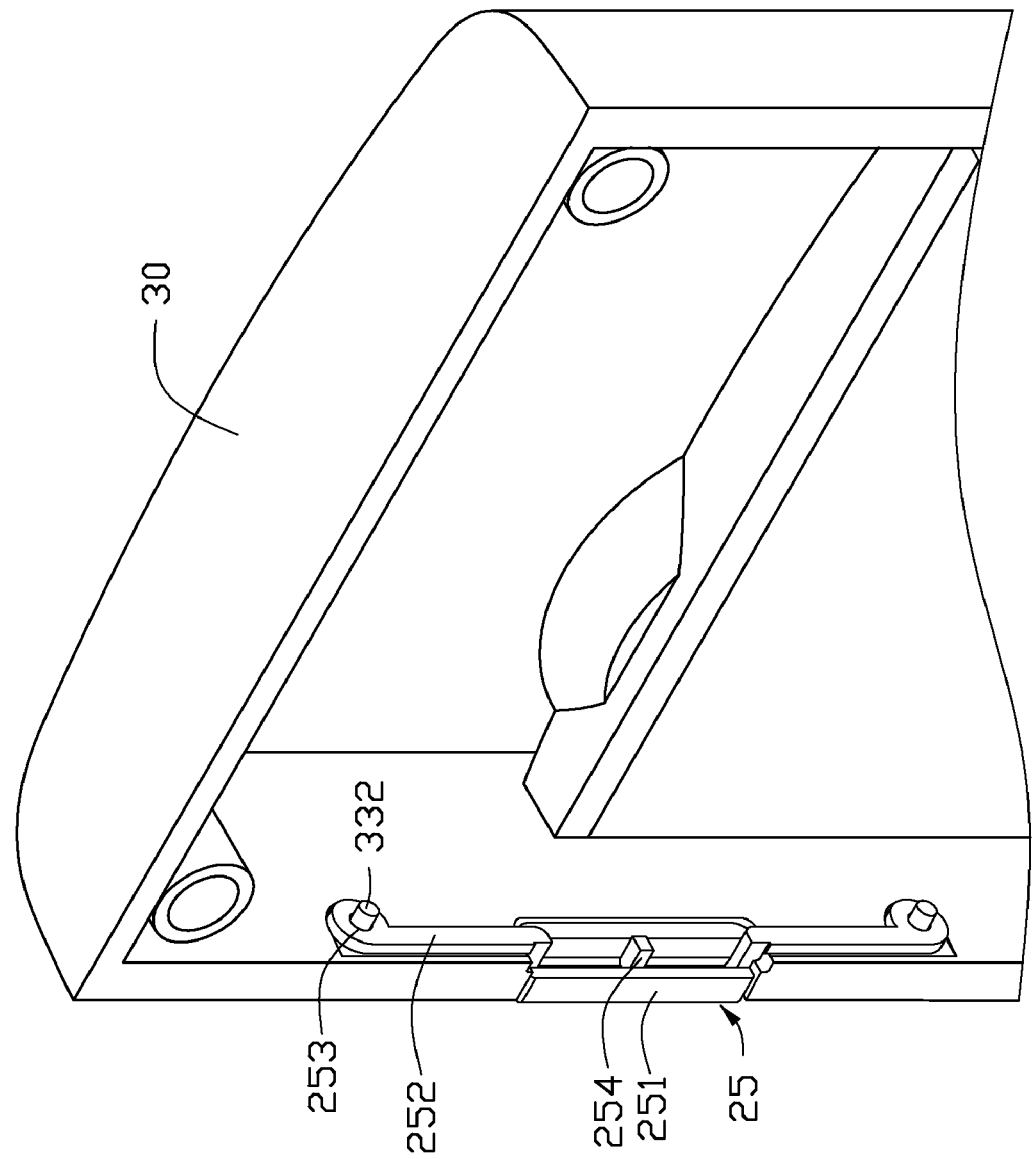
FIG. 5 is an enlarged view of a button assembled to the second housing.

The second housing 30 has a shape substantially corresponding to the first housing 10. The second housing 30 includes two sidewalls 32. One of the sidewalls 32 defines an opening 331, and forms two posts 332 at two sides of the opening 331. Referring to FIG. 5, the button 25 includes a button portion 251, two rods 252 and a resisting portion 254. The button portion 251 is slidably received in the opening 331 of the second housing 30. Two rods 252 extends from two ends of the button portion 251. A distal end of each rod 252 is substantially circular, and defines an aperture 253 engaging with the post 332. The resisting portion 254 is positioned between the rods 252.

Figure 6:
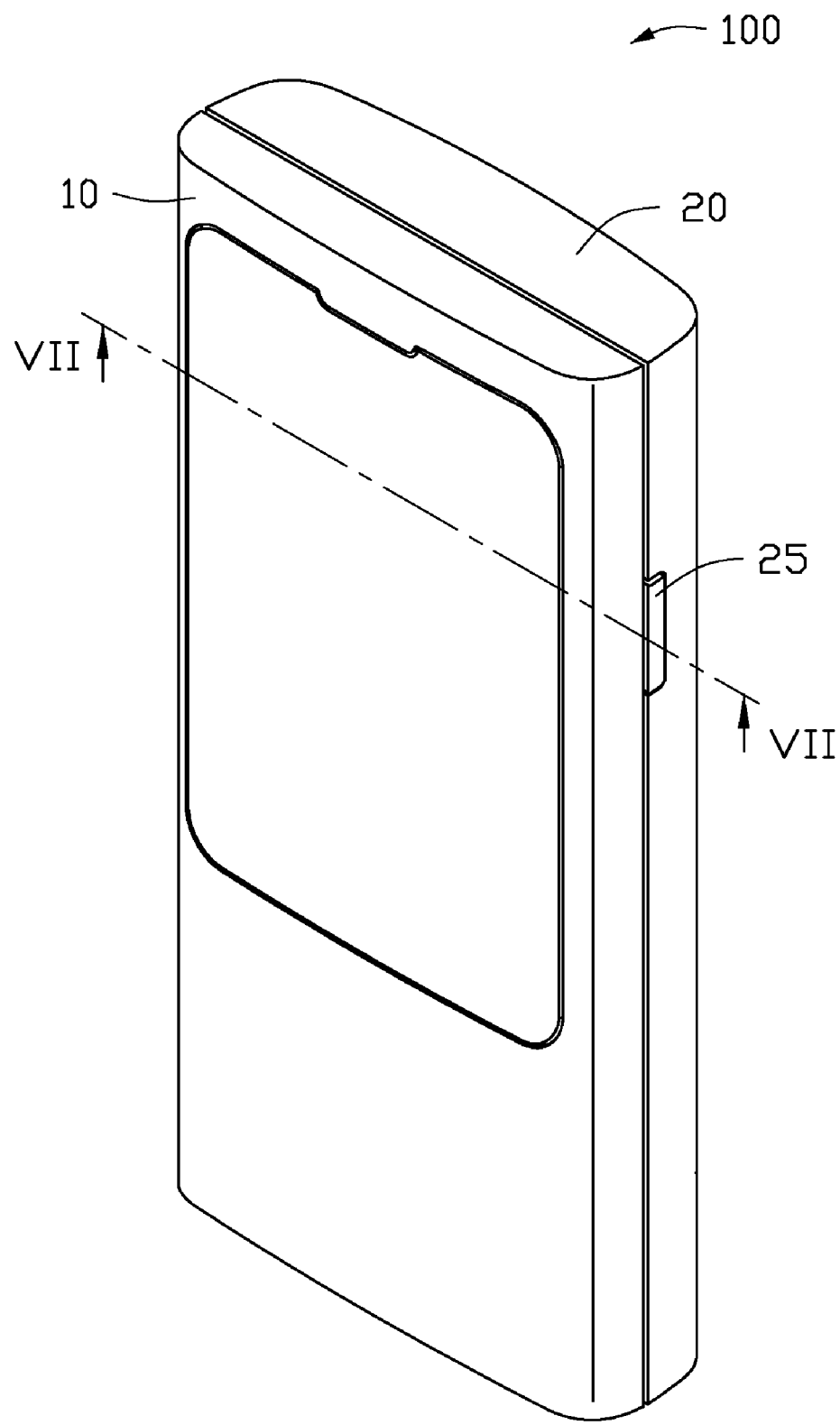
FIG. 6 is an assembled view of the portable electronic device.
Figure 7:
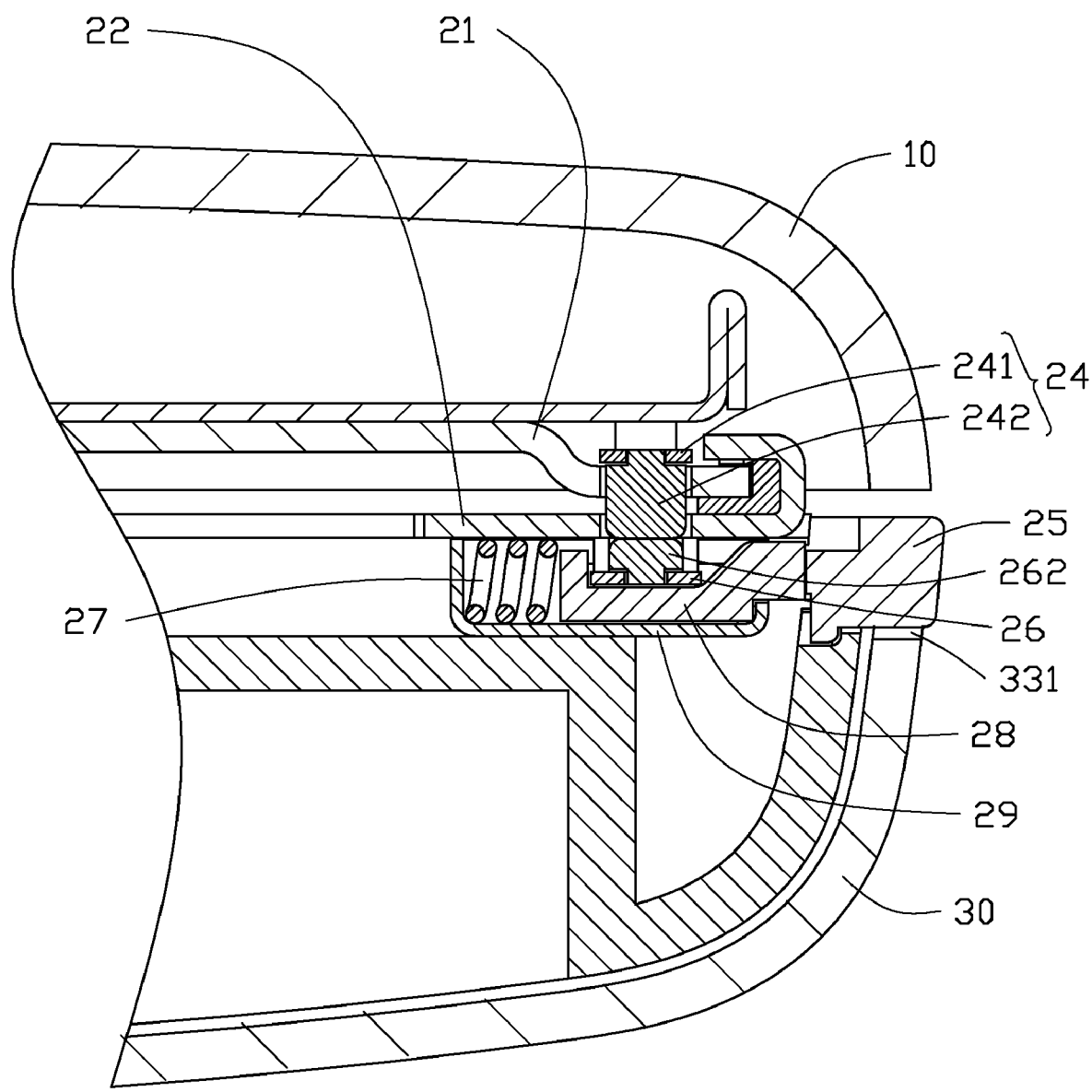
FIG. 7 is a cross-sectional view of FIG. 7 along line VIII-VIII.

Referring to FIGS. 6 to 7, when the slide mechanism 20 is assembled, the distal ends 2414 of the first elastic sheet 241 is fixed to the mounted plate 13. The thinner end 2422 is tightly latched in the bore 2413. Then, the main plate 21 is mounted to the mounted plate 13 of the first housing 10. The connecting portions 231 are respectively secured to the main plate 21 and the slide plate 22. The slide plate 22 slides relative to the main plate 21. The rail portions 212 are received in and can linearly slide within the slide grooves 221. One end of the first column 242 opposite to the thinner end 2422 is received in the first hole 213 and the second hole 223. After that, distal ends 2614 of the second elastic sheet 26 are fixed to one side of the slide plate 22 far away from the main plate 21 by way of, for example, hot melting. The thinner end 2622 of the second column 262 is tightly engaged in the bore 2613. Another end of the second column 262 abuts against the end of the first column 242 received in the second through hole 223 and the first through hole 213.

The cylindrical spring 27 and the contact block 28 are received in the fixing member 29. One end of the cylindrical spring 27 resists the second latching wall 293, the other end resists the first resisting end 282 of the contact block 28. The stepped end 285 of the contact block 28 is latched in the second latching wall 292. The second resisting end 283 is exposed from the fixing member 29. The fixing walls 294 are welded to the slide plate 22. The body 2611 is received in the cavity 281 and the second column 262 abuts against the wedge surface 284. The button 25 is attached to the second housing 30. The button portion 251 is received in the opening 331, the rods 252 are fixed to the posts 332. The second housing 30 is attached to the slide plate 22. The second resisting end 283 abuts against the resisting portion 254. Thus, the slide mechanism 20 is at a closed position and the portable electronic device 100 is at a closed state.

Figure 8:
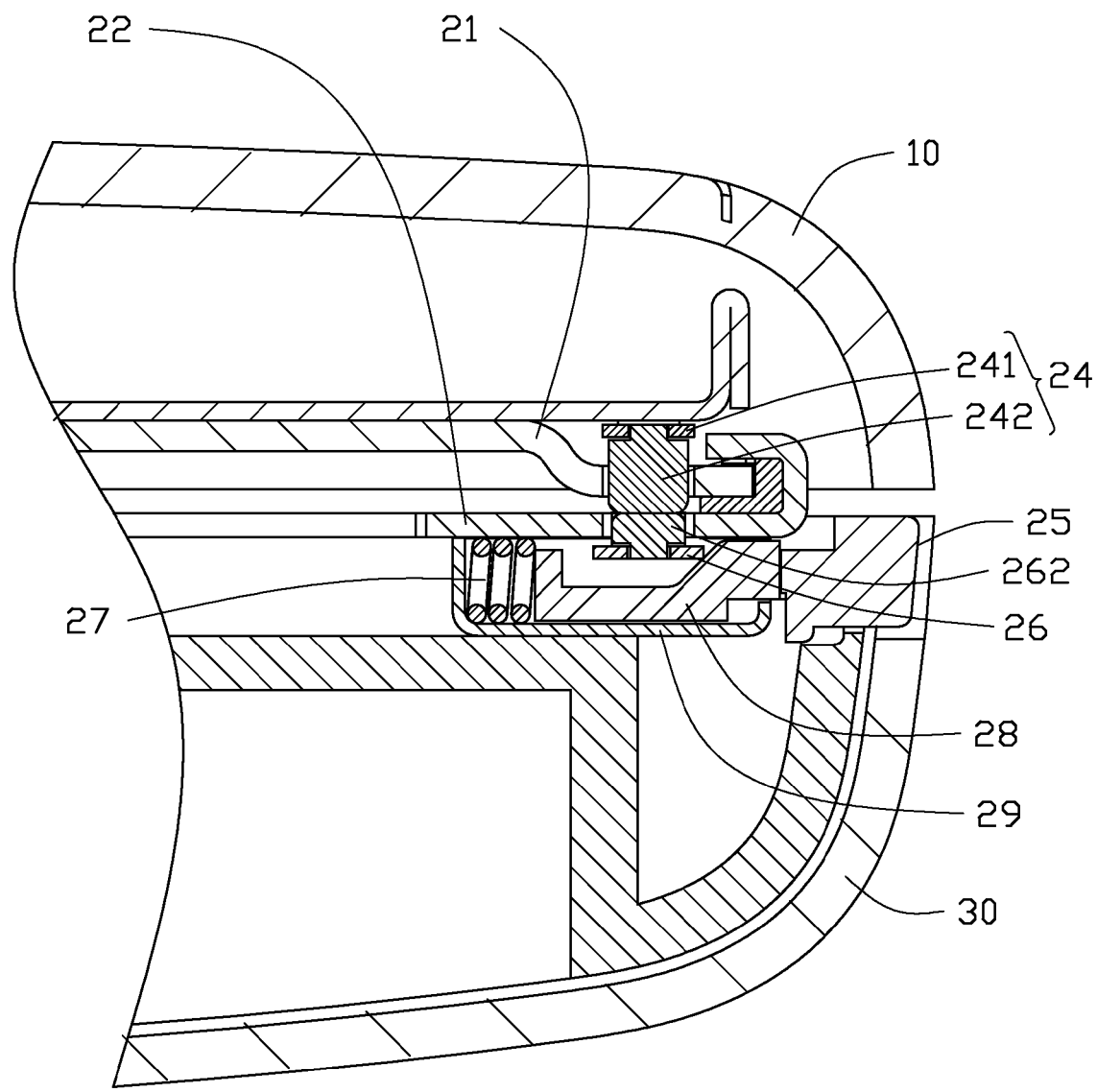
FIG. 8 is similar to FIG. 7, but showing the slide mechanism in an unlocked position.

Referring back to FIG. 8, when the slide mechanism 20 is to be driven from the opened position to the closed position, the button portion 251 is pressed to force the contact block 28 to move. The wedge surface 284 causes the second column 262 to push the first column 242 to move away from the second hole 223 to unlock the main plate 21. After that, the slide plate 22 automatically slides further relative to the main plate 21. When the slide mechanism 20 is driven from the opened position to the closed position, the slide plate 22 slides along the main plate 21 until the first hole 213 is aligned with the second hole 223. The first column 242 is automatically slides into the second hole 223 under the elastic force of the first elastic sheet 241.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A slide mechanism, comprising: a main plate; a slide plate installed on the main plate and slidable relative to the main plate; a locking module locking with the main plate and the slide plate; a releasing module attached to the slide plate to unlock the locking module; and a button operating the releasing module to force the locking module to unlock the slide plate; wherein the locking module includes a first elastic sheet and a first column, and the first column is locked in the slide plate and the main plate; and wherein the releasing module includes a second elastic sheet, a second column, the second elastic sheet is fixed to the slide plate, the second column abuts against the first column.

2. The slide mechanism as claimed in claim 1, wherein the first elastic sheet includes a body, and two arms, each arm respectively extends from two sides of the body.

3. The slide mechanism as claimed in claim 2, wherein the body defines a bore, the main plate defines a first through hole, the slide plate defines a second through hole, and the bore, the first through hole and the second through hole are aligned with each other.

4. The slide mechanism as claimed in claim 3, wherein the column has a thinner end fixed to the bore, the other end extends through the bore, the second through hole to latch in the first through hole.

5. The slide mechanism as claimed in claim 1, wherein the button includes a button portion, two rods and a resisting portion, one rod extends from each of two ends of the button portion.

6. The slide mechanism as claimed in claim 1, further comprising a contact block, the contact block defines a cavity and includes a wedge surface, the second elastic sheet is received in the cavity and abuts against the wedge surface.

7. The slide mechanism as claimed in claim 6, further comprising a fixing member, the fixing member is fixed to the slide plate, and a cylindrical spring and the contact block are received in the fixing member.

8. The slide mechanism as claimed in claim 6, wherein the fixing member includes a base wall, a first latching wall, second latching wall, and two opposite fixing walls, a cutout is defined at each fixing wall.

9. A portable electronic device, comprising: a first housing; a second housing slidably installed on the first housing; a slide mechanism, comprising: a main plate; a slide plate installed on the main plate and slidable relative to the main plate; a locking module locking with the main plate and the slide plate; a releasing module attached to the slide plate to unlock the locking module; and a button operating the releasing module to force the locking module to unlock the slide plate; wherein the locking module includes a first elastic sheet and a first column, and the first column is locked in the slide plate and the main plate; and wherein the releasing module includes a second elastic sheet, a second column, the second elastic sheet is fixed to the slide plate, the second column abuts against the first column.

10. The portable electronic device as claimed in claim 9, wherein the button includes a button portion, two rods and a resisting portion, two rods extend from two ends of the button portion.

11. The portable electronic device as claimed in claim 9, further comprising a contact block, the contact block defines a cavity and includes a wedge surface, the second elastic sheet is received in the cavity and abuts against the wedge surface.

12. The portable electronic device as claimed in claim 11, further comprising a fixing member, the fixing member is fixed to the slide plate, and a cylindrical spring and the contact block are received in the fixing member.

13. The portable electronic device as claimed in claim 12, wherein the fixing member includes a base wall, a first latching wall, a second latching wall, and two opposite fixing walls, a cutout is defined at each fixing wall.

* * * * *